United States Patent
Patel et al.

(10) Patent No.: US 6,656,658 B2
(45) Date of Patent: Dec. 2, 2003

(54) MAGNETITE TONER PROCESSES

(75) Inventors: Raj D. Patel, Oakville (CA); Michael A. Hopper, Toronto (CA); Joseph Bartel, Toronto (CA); Edward G. Zwartz, Mississauga (CA)

(73) Assignee: Xerox Corporation, Stamford, CT (US)

(*) Notice: Subject to any disclaimer, the term of this patent is extended or adjusted under 35 U.S.C. 154(b) by 39 days.

(21) Appl. No.: 10/106,512

(22) Filed: Mar. 25, 2002

(65) Prior Publication Data

US 2003/0180649 A1 Sep. 25, 2003

(51) Int. Cl.$^7$ .................................... G03G 9/083
(52) U.S. Cl. ...................... 430/137.14; 430/106.2
(58) Field of Search .................. 430/137.14, 106.2; 523/335

(56) References Cited

U.S. PATENT DOCUMENTS

| | | | |
|---|---|---|---|
| 4,517,268 A | 5/1985 | Gruber et al. | 430/39 |
| 4,758,506 A | 7/1988 | Lok et al. | 430/903 |
| 4,859,550 A | 8/1989 | Gruber et al. | 430/39 |
| 5,034,298 A | 7/1991 | Berkes et al. | 430/110 |
| 5,278,020 A | 1/1994 | Grushkin et al. | 430/137 |
| 5,290,654 A | 3/1994 | Sacripante et al. | 430/137 |
| 5,308,734 A | 5/1994 | Sacripante et al. | 430/137 |
| 5,344,738 A | 9/1994 | Kmiecik-Lawrynowicz et al. | 430/137 |
| 5,370,963 A | 12/1994 | Patel et al. | 430/137 |
| 5,510,221 A | 4/1996 | Matalevich et al. | 430/106.6 |
| 5,780,190 A | 7/1998 | Listigovers et al. | 430/39 |
| 5,914,209 A | 6/1999 | Grushkin | 430/106.6 |
| 5,925,488 A | 7/1999 | Patel et al. | 430/137 |
| 5,977,210 A | 11/1999 | Patel et al. | 523/161 |
| 5,994,020 A | 11/1999 | Patel et al. | 430/137 |
| 6,103,440 A * | 8/2000 | Lohr | 430/110 |
| 6,132,924 A | 10/2000 | Patel et al. | 430/137 |
| 6,268,102 B1 | 7/2001 | Hopper et al. | 430/137.14 |
| 6,352,810 B1 * | 3/2002 | Jiang et al. | 430/137.11 |

OTHER PUBLICATIONS

Copending Application Ser. No. 09/877,747, filed Jun. 11, 2001, on "Toner Coagulant Processes" by Lu Jiang et al.
Copending Application Ser. No. 09/922,263, filed Aug. 16, 2001, on "Toner Coagulant Processes" by Raj D. Patel et al.
Copending Application Ser. No. 09/810,138, filed Mar. 19, 2001, on "Toner Coagulant Processes" by Michael A. Hopper et al.
Copending Application Ser. No. 10/062,129, filed Feb. 4, 2002, on "Toner Processes" by Lu Jiang et al.
Copending Application Ser. No. 09/976,943, filed Oct. 15, 2001, on "Toner Coagulant Processes" by Daryl Vanbesien et al.

* cited by examiner

*Primary Examiner*—John Goodrow
(74) *Attorney, Agent, or Firm*—E. O. Palazzo

(57) ABSTRACT

A toner process comprising heating an acidified dispersion of an acicular magnetite, a carbon black colorant dispersion, an optional wax dispersion, and an acicular latex.

32 Claims, No Drawings

MAGNETITE TONER PROCESSES

Illustrated in copending application U.S. Ser. No. 10/106,078 on Toner Processes, filed concurrently herewith, the disclosure of which is totally incorporated herein by reference, is a toner process comprising heating an acidified dispersion of an acicular magnetite with an anionic latex, an anionic carbon black dispersion, and an anionic wax dispersion.

Illustrated in copending application U.S. Ser. No. 10/086,063 on Toner Processes, the disclosure of which Is totally Incorporated herein by reference, is a process comprising heating a latex, a colorant dispersion, a polytetrafluoroethylene dispersion, and an organo metallic complexing component.

Illustrated in copending application U.S. Ser. No. 10/106,520 on Toner Coagulant Processes, the disclosure of which is totally incorporated herein by reference, is a process for the preparation of toner comprising;

(i) generating or providing a latex emulsion containing resin water and an ionic surfactant, and generating or providing a colorant dispersion containing colorant, water, and an ionic surfactant, or a nonionic surfactant;

(i) generating or providing a latex emulsion containing resin, water, and an ionic surfactant, and generating or providing a colorant (ii) blending the latex emulsion with the colorant dispersion;

(iii) adding to the resulting blend a coagulant of a polyamine salt of an acid wherein the salt is of an opposite charge polarity to that of the surfactant latex;

(iv) heating the resulting mixture below or about equal to the glass transition temperature (Tg) of the latex resin;

(v) optionally adding a second latex comprised of resin particles suspended in an aqueous phase resulting in a shell;

(vi) adjusting with a base the pH to about 7 to about 9;

(vii) heating the resulting mixture of (vi) above about the Tg of the latex resin;

(viii) retaining the heating until the fusion or coalescence of resin and colorant is initiated;

(ix) changing the pH of the above (viii) mixture with an acid to arrive at a pH of about 1.5 to about 3.5 to thereby accelerate the fusion or the coalescence and resulting in toner particles comprised of resin, and colorant; and (x) optionally isolating the toner.

Illustrated in copending application U.S. Ser. No. 10/106,519 on Toner Processes, the disclosure of which is totally incorporated herein by reference, is a process for the preparation of a magnetic toner comprising heating a colorant dispersion containing acicular magnetite, a carbon black dispersion, a latex emulsion, and a wax dispersion.

Illustrated in copending application U.S. Ser. No. 10/106,514 on Toner Processes, the disclosure of which is totally incorporated herein by reference, is a process for the preparation of a magnetic toner comprising the heating of a colorant dispersion comprised of a magnetite dispersion, and a carbon black dispersion, and thereafter mixing with a basic cationic latex emulsion and a wax dispersion.

Illustrated in U.S. Pat No. 6,541,175, filed Feb. 4, 2002 on Toner Processes, the disclosure of which is totally incorporated herein by reference, is a process comprising.

(i) providing or generating an emulsion latex comprised of sodio sulfonated polyester resin particles by heating said particles in water at a temperature of from about 65° C. to about 90° C.;

(ii) adding with shearing to said latex (i) a colorant dispersion comprising from about 20 percent to about 50 percent of a predispersed colorant in water, followed by the addition of an organic or an inorganic acid;

(iii) heating the resulting mixture at a temperature of from about 45° C. to about 65° C. followed by the addition of a water insoluble metal salt or a water insoluble metal oxide thereby releasing metal ions and permitting aggregation and coalescence, optionally resulting in toner particles of from about 2 to about 25 microns in volume average diameter; and optionally Illustrated in U.S. Pat Nos. 6,495,302; 6,416,920; 6,500,597; 6,562,541 and 6,576,389, the disclosures of which are totally incorporated herein by reference, are toner processes wherein a coagulant may be selected.

In embodiments disclosed herein, the appropriate components and appropriate process aspects of the above copending applications may be selected for the processes of the present invention.

BACKGROUND

The present invention relates to toner processes, and more specifically, to aggregation and coalescence processes for the preparation of toner compositions containing magnetite. More specifically, the present invention in embodiments relates to processes for the preparation of a toner composition by a chemical process, such as emulsion aggregation, wherein the anionic latex particles selected are aggregated with the colorant particles, such as positively charged magnetite or iron oxides particles, and wherein the positive charge on the magnetite is induced by acidifying the colorant dispersion, thus such particles can simultaneously function as colorant particles and as a flocculating agent, and thereafter coalescing or fusing to provide toner size particles which when developed by an electrographic process generates documents suitable for magnetic image character recognition or MICR. By acidifying the magnetite dispersion, for example changing the pH of the dispersion, which is from about 6.5 to about 6.8, and where the resulting charge on the magnetite particles is about 0 to about −5 coulombs/$cm^2$ and when acidified with an acid to the dispersion is at a pH of about 1.8 to about 2.2 resulting in an induction of a positive charge on the magnetite particles of about +45 to about +35 coulombs/$cm^2$. The positively charged colorant particles can then be readily aggregated with a suitable anionically charged species, such as an anionic resin latex, an anionic wax dispersion, anionic carbon black dispersion where the black dispersion is comprised, for example, of resin, wax and carbon black particles suspended in water in the presence of an anionic surfactant.

REFERENCES

In U.S. Pat. No. 6,132,924, the disclosure of which is totally incorporated herein by reference, there is illustrated a process for the preparation of toner comprising mixing a colorant a latex, and a coagulant, followed by aggregation and coalescence, wherein the coagulant may be a polyaluminum chloride.

In U.S. Pat. No. 6,268,102, the disclosure of which is totally incorporated herein by reference, there is illustrated a process for the preparation of toner comprising mixing a colorant, a latex, and a coagulant, followed by aggregation and coalescence, wherein the coagulant may be a polyaluminum sulfosilicate.

Illustrated in U.S. Pat. No. 5,994,020, the disclosure of which is totally incorporated herein by reference, are toner preparation processes, and more specifically, a process for the preparation of toner comprising:

(i) preparing, or providing a colorant dispersion;

(ii) preparing, or providing a functionalized wax dispersion comprised of a functionalized wax contained in a dispersant mixture comprised of a nonionic surfactant, an ionic surfactant, or mixtures thereof;

(iii) shearing the resulting mixture of the functionalized wax dispersion (ii) and the colorant dispersion (i) with a latex or emulsion blend comprised of resin contained in a mixture of an anionic surfactant and a nonionic surfactant;

(iv) heating the resulting sheared blend of (iii) below about the glass transition temperature (Tg) of the resin particles;

(v) optionally adding additional anionic surfactant to the resulting aggregated suspension of (iv) to prevent, or minimize additional particle growth of the resulting electrostatically bound toner size aggregates during coalescence (iv);

(vi) heating the resulting mixture of (v) above about the Tg of the resin; and optionally, (vii) separating the toner particles.

With respect to the references only a small part thereof has been selected and this part may or may not be fully representative of the prior art teachings or disclosures.

Magnetic ink printing methods with inks containing magnetic particles are known. For example, there is disclosed in U.S. Pat. No. 3,998,160, the disclosure of which is totally incorporated herein by reference, that various magnetic inks have been used in printing digits, characters, or artistic designs, on checks or bank notes. The magnetic ink used for these processes contains, for example, magnetic particles, such as magnetite in a fluid medium, and a magnetic coating of ferric oxide, chromium dioxide, or similar materials dispersed in a vehicle comprising binders, and plasticizers. According to the disclosure of the '160 patent, there is provided a method of printing on a surface with an ink including certain shaped magnetic particles permitting the authenticity of the printing can be verified, and wherein a pattern is formed on a carrier with the ink in the wet state, and wherein the particles are subjected to a magnetic aligning process while the ink is on the carrier.

Disclosed in U.S. Pat. No. 4,128,202, the disclosure of which is totally incorporated herein by reference, is a device for transporting a document that has been mutilated or erroneously encoded wherein there is provided a predetermined area for the receipt of correctly encoded magnetic image character recognition information (MICR). As indicated in this patent, the information involved is referred to as MICR characters, which characters appear, for example, at the bottom of personal checks as printed numbers and symbols. These checks have been printed with an ink containing magnetizable particles therein, and when the information contained on the document is to be read, the document is passed through a sorter/reader which first magnetizes the magnetizable particles, and subsequently detects a magnetic field of the symbols resulting from the magnetic retentivity of the ink. The characters and symbols involved, according to the '202 patent are generally segregated into three separate fields, the first field being termed a transient field, which contains the appropriate symbols and characters to identify the bank, bank branch, or the issuing source. The second field contains the account affected by the transactions, and the third field, which is not be pre-recorded indicates the amount of the check.

In U.S. Pat. No. 5,914,209, the disclosure of which is totally incorporated by reference, there is illustrated a process for preparing MICR toners using a combination of hard and soft magnetites and lubricating wax in the formulation and melt mixing with a resin followed by jetting, and classifying the blend to provide toner compositions.

In U.S. Pat. No. 4,517,268, the disclosure of which is totally incorporated by reference, there is illustrated a process for the preparation of MICR toners by melt mixing the appropriate components in a Banbury apparatus, following by pulverizing the magnetite and the resin, and then jetting and classifying to provide, for example, about 10 to about 12 micron toner size particles which when mixed with an additive package and carrier can provide a developer suitable for the Xerox Corporation 9700®.

Other patents relating to MICR processes include U.S. Pat. Nos. 4,859,550; 5,510,221, and 5,034,298, the disclosures of which are totally incorporated herein by reference.

In U.S. Pat. No. 5,780,190, the disclosure of which is totally incorporated herein by reference, there is disclosed an ionographic process which comprises the generation of a latent image comprised of characters; developing the image with an encapsulated magnetic toner comprised of a core comprised of a polymer and soft magnetite, and wherein the core is encapsulated within a polymeric shell; and subsequently providing the developed image with magnetic ink characters thereon to a reader/sorter device.

Illustrated in U.S. Pat. No. 4,758,506, the disclosure of which is totally incorporated herein by reference, are single component development cold pressure fixable toner compositions, wherein the shell selected can be prepared by an interfacial polymerization process. Also known are single component magnetic cold pressure fixable toner compositions comprised of magnetite and a polyisobutylene encapsulated in a polymeric shell material generated by an interfacial polymerization process.

In situations requiring MICR capabilities, the toners selected should contain magnetites having specific properties, an important one of which is a high enough level of remanence or retentivity. Retentivity is a measure of the magnetism remaining when the magnetite is removed from the magnetic field, i.e., the residual magnetism. Also, of interest is the high retentivity such that when the characters are read, the magnetites produce a signal, or signal strength of the toner composition. The magnetic signal level is of value in MICR systems, and the signal level can vary in proportion to the amount of toner deposited on the document being generated. The signal strength of the toner composition can be measured by using known devices, including the MICR-Mate 1, manufactured by Checkmate Electronics, Inc.

Forming toner compositions by emulsion aggregation processes are known. For example, emulsion/aggregation/coalescing processes for the preparation of toners are illustrated in a number of Xerox patents, the disclosures of which are totally incorporated herein by reference, such as U.S. Pat No. 5,290,654, U.S. Pat No. 5,278,020, U.S. Pat. No. 5,308,734, U.S. Pat No. 5,370,963, U.S. Pat No. 5,344,738, U.S. Pat. No. 5,403,693, U.S. Pat No. 5,418,108, U.S. Pat No. 5,364,729, and U.S. Pat. No. 5,346,797; and also of interest may be U.S. Pat. Nos. 5,348,832; 5,405,728; 5,366,841; 5,496,676; 5,527,658; 5,585,215; 5,650,255; 5,650,256; 5,501,935; 5,723,253; 5,744,520; 5,763,133; 5,766,818; 5,747,215; 5,827,633; 5,853,944; 5,804,349; 5,840,462; 5,869,215; 5,869,215; 5,863,698; 5,902,710; 5,910,387; 5,916,725; 5,919,595; 5,925,488 and 5,977,210.

In addition, the following U.S. patents relate to emulsion aggregation processes of forming toner compositions, the disclosures of which are totally incorporated herein by reference.

U.S. Pat No. 5,922,501 describes a process for the preparation of toner comprising blending an aqueous colorant dispersion and a latex resin emulsion, and which latex resin is generated from a dimeric acrylic acid, an oligomer acrylic acid, or mixtures thereof and a monomer; heating the resulting mixture at a temperature about equal, or below about the glass transition temperature (Tg) of the latex resin to form aggregates; heating the resulting aggregates at a temperature about equal to, or above about the Tg of the latex resin to effect coalescence and fusing of the aggregates; and optionally isolating the toner product, washing, and drying.

U.S. Pat No. 5,945,245 describes a surfactant free process for the preparation of toner comprising heating a mixture of an emulsion latex, a colorant, and an organic complexing agent.

U.S. Pat No. 5,482,812 describes a process for the preparation of toner compositions or toner particles comprising (i) providing an aqueous pigment dispersion comprised of a pigment, an ionic surfactant, and optionally a charge control agent; (ii) providing a wax dispersion comprised of wax, a dispersant comprised of nonionic surfactant, ionic surfactant or mixtures thereof; (iii) shearing a mixture of the wax dispersion and the pigment dispersion with a latex or emulsion blend comprised of resin, a counterionic surfactant with a charge polarity of opposite sign to that of the ionic surfactant and a nonionic surfactant; (iv) heating the above sheared blend below about the glass transition temperature (Tg) of the resin to form electrostatically bound toner size aggregates with a narrow particle size distribution; (v) adding additional ionic surfactant to the aggregated suspension of (iv) to ensure that no, or minimal additional particle growth of the electrostatically bound toner size aggregates occurs on further increasing the temperature to coalesce the aggregates into toner particles (vi); (vi) heating the mixture of (v) with bound aggregates above about or at the Tg of the resin; and optionally (vii) separating the toner particles from the aqueous slurry by filtration and thereafter optionally washing.

U.S. Pat No. 5,622,806 describes a process, for example, for the preparation of toner compositions with controlled particle size comprising (i) preparing a pigment dispersion in water, which dispersion is comprised of a pigment, an ionic surfactant in amounts of from about 0.5 to about 10 percent by weight to water, and an optional charge control agent; (ii) shearing the pigment dispersion with a latex mixture comprised of a counterionic surfactant with a charge polarity of opposite sign to that of the ionic surfactant, a nonionic surfactant, and resin particles, thereby causing a flocculation or heterocoagulation of the formed particles of pigment, resin, and charge control agent; and (iii) stirring.

SUMMARY

It is a feature of the present invention to provide a magnetite containing toner for Magnetic Ink Character Recognition processes by, for example, utilizing a specific type of magnetite, such as acicular or needle shape, to provide an acceptable readability signal by a check reader.

In a further feature of the present invention, there is provided a process for the preparation of a MICR toner by emulsion aggregation processes in which the magnetite or the iron oxide particles are dispersed in water in the presence of an anionic surfactant, and which dispersion is then acidified by, for example, changing the pH of the dispersion, which is from about 6.5 to about 6.8, to about 1.8 to about 2.2, and where the initial charge on the magnetite particles is about 0 to about −5 coulombs/cm$^2$ and when acidified with an acid to a pH of about 1.8 to about 2.2 results in an induction of a positive charge on the magnetite particles of about +45 to about +35 coulombs/cm$^2$ thereby allowing the magnetite particles to function as a positively charged coagulating agent at low pH, for example from about 1.8 to about 2.2, or acidic conditions without loss in the surface charge with the addition of an anionic species, such as anionic latex, wax or a carbon black dispersion, and without the need of any external coagulating agents such as polymetal halides or polymetal sulfosilicates.

Also, in a feature of the present invention there is provided a process wherein the acidification of the dispersion containing magnetite particles in water and an anionic surfactant with an acid results in an induction of a positive charge on the magnetite particles, and hence the magnetite particles can also function as the primary coagulant and also a pigment.

In another feature of the present invention there is provided the use of cationically charged magnetic pigment particles wherein the charge results from acidification, allowing the incorporation or adhesion of secondary colorant particles of carbon black and wax particles on the surface of the magnetite pigment particles wherein the carbon black is in the form of an anionic dispersion, and the wax is also in the form of an anionic dispersion. The anionic latexes, which are generally acidic, for example, having a pH of about 1.8 are then added to the acidified dispersion containing the magnetite pigment particles, carbon black, and wax, resulting in a mixture of magnetite pigment particles, carbon black, wax and latex resin particles wherein the mixture is at a pH of about 1.9 to about 2.2, thereby providing sufficient positive charge for the latex resin particles to adhere on to the precoated magnetite particles.

In another feature of the present invention the process of acidifying the magnetite dispersion to a pH of about 2 results in an induction of positive charge, which charge is sufficiently high enough, for example about +35 to +50 coulombs/cm$^2$, that upon the addition of an acidic anionic latex whose pH is about 1.6 to about 1.9, there results a mixture having a pH of about 2, wherein little to no change of the charge of the magnetite particle is observed. The charge is sufficiently high enough such that when the delayed or second latex containing a resin is added to the toner size aggregates, the latex resin is adhered within a period of about 30 to about 60 minutes to the aggregates comprising magnetite, carbon black and wax particles, and which delayed resin can form a thin shell or coating.

It is a further a feature of the present invention to provide an improved process for the adhesion of the delayed latex resin particles wherein the time for full adhesion is reduced by about 80 percent usually when compared to a nonacidified magnetite dispersion wherein the time required for the adhesion is about 6 to about 8 hours.

It is further another feature of the present invention to provide a MICR toner prepared by emulsion aggregation wherein the particle morphology can be tailored from, for example, a potato to spherical shape.

It is also a feature of the present invention to provide a MICR toner by emulsion aggregation and the incorporation of needle shape or acicular magnetite particles, which are of a size diameter of, for example, about 450 nanometers to about 700 nanometers wherein the amount of acicular magnetite loading is about 25 to about 35 weight percent of toner and to thereby provide a sufficient magnetic signal.

Another feature of the present invention resides in a process for preparing a MICR toner wherein acidification of the magnetite dispersion provides an advantage in which the sequence of the addition of, for example, the secondary colorant, such as carbon black, followed by the addition of the wax can be interchanged without any substantial detrimental effect to the process.

It is yet another feature of the present invention to provide a process that is capable of incorporating into toners needle shape or acicular magnetite, which have a coercivity of about twice that of cubic or spherical magnetite, to thereby provide an adequate magnetic signal for readability by commercial check readers. The magnetic signal is the measure of the standard calibration document as defined by the Banker's Association Standard and Specifications for MICR Encoded Document. Generally, each country sets a minimum percent signal level, for example the minimum signal level in the USA is about 50 percent of the nominal, while in Canada it is about 80 percent of the nominal. To ensure latitude in the printing process, it is generally desirable to exceed the nominal specification, for example the target signal desired can be about 115 to about 130 percent of the nominal to minimize the document rejection rates.

EMBODIMENTS

Aspects disclosed herein relate to a toner process comprising heating a mixture of an acidified dispersion of an acicular magnetite with a colorant dispersion of carbon black, a wax dispersion, and an acidic latex emulsion; a toner process comprising heating an acidified dispersion of an acicular magnetite, a carbon black colorant dispersion, an optional wax dispersion, and a latex; a process comprising heating a magnetite dispersion, a carbon black dispersion, and a latex emulsion, which heating is initially accomplished at a temperature below about the glass transition temperature of resin contained in the latex, followed by a heating above about the glass transition temperature Tg of the resin; a process wherein the acicular selected exhibits a coercivity of from about 250 to about 700 Oe; wherein the acicular magnetite, which can be comprised of about 21 percent FeO and 79 percent $Fe_2O_3$, is selected from the group consisting of B2510, B2540, B2550, HDM-S 7111 whose coercivity is each from about 250 to about 500 Oe with a remanent magnetization (Br) of about 22 to about 39 emu/g, and a saturation magnetization (Bm) of about 70 to about 90 emu/g, available from Magnox; MR-BL whose coercivity is 340 Oe, a remanent magnetization (Br) of about 34 emu/g, and a saturation magnetization (Bm) of 85 emu/g, available from Titan Kogyo and Columbia Chemicals; MTA-740 whose coercivity is about 370 Oe with a remanent magnetization (Br) of 30 emu/g, and a saturation magnetization (Bm) of 83 emu/g, available from Toda Kogyo, and the like; a process wherein the colorant is a magnetite pigment of a size diameter of about 0.6 micron to about 0.1 micron and the carbon black is of a size diameter of about 0.01 to about 0.2 micron in average volume diameter; a process wherein the pH of the mixture resulting in (vi) is increased from 2 to 2.6 to 6.5 to 7.2, and wherein the base functions primarily as a stabilizer for the aggregates during coalescence, and no or minimal toner particle size or GSD increases result; a process wherein the .aggregation temperature is from about 45° C. to about 60° C., and wherein the coalescence or fusion temperature is from about 85° C. to about 95° C.; the time of coalescence or fusion is from about 8 to about 14 hours, and wherein there are provided toner particles with a smooth morphology; a process wherein the latex contains a resin or polymer selected from the group consisting of poly(styrene-alkyl acrylate), poly (styrene-1,3-diene), poly(styrene-alkyl methacrylate), poly (styrene-alkyl acrylate-acrylic acid), poly(styrene-1,3-diene-acrylic acid), poly(styrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylateacrylic acid), poly (styrene-alkyl acrylate-acrylonitrile-acrylic acid), poly (styrene-1,3-diene-acrylonitrile-acrylic acid), poly(alkyl acrylate-acrylonitrile-acrylic acid), and the like; a process wherein the latex contains a resin selected from the group consisting of poly(styrene-butadiene), poly(methylstyrene-butadiene), poly(methyl methacrylate-butadiene), poly (ethyl methacrylate-butadiene), poly(propyl methacrylate-butadiene), poly(butyl methacrylate-butadiene), poly (methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly (propyl acrylate-isoprene), poly(butyl acrylate-isoprene), poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylononitrile), and poly (styrene-butyl acrylate-acrylononitrile-acrylic acid); a process wherein the acidification of the dispersion containing magnetite particles in water and an anionic surfactant with an acid results in an induction of a positive charge on the magnetite particles, and hence the magnetite particles can function as the primary coagulant in addition to functioning as a pigment; a process wherein the initial pH of the magnetite dispersion is about 6.3 to about 6.8, and wherein adding an acid to the dispersion results in a pH of about 1.8 to about 2.2 thereby inducing a positive charge on the magnetite and then adding an anionic colorant dispersion of a carbon black, followed by the addition of an anionic wax dispersion to form a magnetite, carbon black, wax blend whose pH is about 2; blending the acidic resin latex dispersion having a pH of 1.8 to about 2.2 with the magnetite/pigment dispersions, and retaining an induced positive charge on the solids to initiate flocculation or aggregation of the resin, carbon black and wax on the magnetite particles; continuously subjecting the mixture to high shear to induce a homogeneous blend of the resin pigment wax and magnetite; which blend is at a pH of about 2; heating the sheared gel at temperatures below the glass transition temperature (Tg) of the resin while continuously stirring to form aggregate particles; and following a suitable period of time to permit stabilization of the aggregate particle size adding a latex comprised of the same latex formulation as that of, or optionally an acidic anionic latex comprising a different formulation than that of (i), followed by mixing for a period of about 30 to about 60 minutes to allow the full incorporation of the latex added, since at pH of about 2 there is sufficient positive charge still present to attract the anionic latex particles; modifying the pH of the slurry to a pH of about 6.5 to about 7 to prevent any further growth of the aggregate particles, heating the aggregate particles at temperatures above the Tg of the resin, followed by lowering the pH of the aggregate particles to about 5.3 and heating further for a period of about 7 to about 14 hours to form coalesced toner particles, and isolating the toner; a process wherein the blending and aggregation are performed at a pH of 1.5 to 2.3 or about 1.8 to about 2.2, while the coalescence is initially conducted at a pH range of about 6.5 to about 7.5 followed by a reduction in pH to about 5.3 to about 5.8 followed by further heating for a period of about 7 to about 14 hours; a process for preparing a MICR toner composition by emulsion aggregation, and which toner contains about 25 to about 35 weight percent of acicular or needle shape magnetite and wherein there is provided smooth particles with a particle size distribution as measured on a Coulter Counter of about 1.20 to about 1.26, and wherein there is provided a MICR signal in the range of about 115 to about 135 percent and a bulk remanence of about 26 emu/g wherein the remanence is measured on a tapped powder magnetite sample in a cell of 1 centimeter by 1 centimeter by about 4 centimeters. The sample is magnetized between two magnetic pole faces with a saturating magnetic field of 2,000 Gauss, such that the induced magnetic field is perpendicular to one of the 1 by 4 centimeter faces of the cell. The sample is removed from the saturating magnetic field, and the remanence is measured perpendicular to the above 1 centimeter wide face, using a Hall-Effect device or a gaussmeter, such as the F. W. Bell, Inc. Model 615 gaussmeter.

At or slightly above room temperature, about 22° C. to about 25° C., the magnetite dispersion with a pH, for example, of about 6.5 to about 6.8 has a positive charge of about 0 to about −5 coulombs/cm$^2$ and when the dispersion is acidified to a pH of about 1.5 to about 2.5, the positive charge increases, for example, to about +35 to about +50 coulombs/cm$^2$. The positive charge induced can permit the magnetite particles to function as a coagulating agent for an anionic species, such as an anionic resin latex, an anionic carbon black dispersion comprising carbon black particles dispersed in water in the presence of an anionic surfactant, and an anionic wax dispersion comprising wax particles dispersed in water in the presence of an anionic surfactant, and thus resulting in coagulation of the magnetite, carbon black, wax and resin particles. At about 30 weight percent loading of the acicular magnetite, there is sufficient positive charge generated to coagulate the latex, carbon black, wax and magnetite. At a magnetite amount, a loading of, for example, less than about 30 weight percent, for example 20 percent, there can be selected an external coagulant, such as a metal halide, for example polyaluminum chloride to, for example, provide a narrow particle size distribution, for example, of about 1.20 to about 1.25.

Magnetic characteristics associated with the toners generated with the processes of the present invention include, for example, differing shape and excellent magnetic configuration of each character. For example, in a typical signal strength test, a MICR-Mate 1 reading device is calibrated to read the "on-us" character as 100 percent signal strength defined as the nominal. The relative signal strength of test characters for a given toner composition are then be measured by reading their characters with the calibrated device. Each test character will read more or less than 100 percent signal strength. The signal is the measure of the standard calibration document as defined by the Banker's Association Standard and Specifications for MICR Encoded Document. Generally, each country sets a minimum percent signal level, for example the minimum signal level in the USA is 50 percent of the nominal, while in Canada it is 80 percent of the nominal. To ensure latitude in the printing process, it is generally desirable to exceed the nominal specification, for example the target signal which is about 115 to about 130 percent of the nominal to minimize the document rejection rates.

When a magnetite, such as cubic or spherical magnetite, is used to prepare MICR toners using the emulsion aggregation process then solids loadings equal to or in excess of about 60 weight percent can be selected to provide the same amount of positive charge as that of 30 weight percent loading of an acicular magnetite.

Illustrative examples of resin particles selected for the process of the present invention include known polymers selected from the group consisting of poly(styrene-butadiene), poly(para-methyl styrene-butadiene), poly(meta-methyl styrene-butadiene), poly(alpha-methyl styrene-butadiene), poly(methylmethacrylate-butadiene), poly(ethylmethacrylate-butadiene), poly(propylmethacrylate-butadiene), poly(butylmethacrylate-butadiene), poly(methylacrylate-butadiene), poly(methylacrylate-butadiene), poly(propylacrylate-butadiene), poly(butylacrylate-butadiene), poly(styrene-isoprene), poly(para-methyl styrene-isoprene), poly(meta-methyl styrene-isoprene), poly(alpha-methylstyrene-isoprene), poly(methylmethacrylate-isoprene), poly(ethylmethacrylate-isoprene), poly(propylmethacrylate-isoprene), poly(butylmethacrylate-isoprene), poly(methylacrylate-isoprene), poly(ethylacrylate-isoprene), poly(propylacrylate-isoprene), and poly(butylacrylate-isoprene); and terpolymers such as poly(styrene-butadiene-acrylic acid), poly(styrene-butadiene-methacrylic acid), PLIOTONE™ available from Goodyear, polyethylene-terephthalate, polypropylene-terephthalate, polybutylene-terephthalate, polypentylene-terephthalate, polyhexalene-terephthalate, polyheptadene-terephthalate, polyoctalene-terephthalate, POLYLITE™ (Reichhold Chemical Inc.), PLASTHALL (Rohm & Haas), CYGAL (American Cyanamide), ARMCO™ (Armco Composites), ARPOL™ (Ashland Chemical), CELANEX™ (Celanese Eng), RYNITE™ (DuPont), and STYPOL™.

The resin particles selected, which generally can be in embodiments styrene acrylates, styrene butadienes, styrene methacrylates, or polyesters, are present in various effective amounts, such as from about 70 weight percent to about 98 weight and preferably about 80 to about 92 percent of the toner, and can be of small average particle size such as from about 0.01 micron to about 1 micron in average volume diameter as measured by the Brookhaven nanosize particle analyzer. Other effective amounts of resin can be selected.

The resin particles selected for the process of the present invention can be prepared by, for example, emulsion polymerization techniques, including semicontinuous emulsion polymerization methods, and the monomers utilized in such processes can be selected from, for example, styrene, acrylates, methacrylates, butadiene, isoprene, and optionally acid or basic olefinic monomers such as acrylic acid, methacrylic acid, acrylamide, methacrylamide, quaternary ammonium halide of dialkyl or trialkyl acrylamides or methacrylamide, vinylpyridine, vinylpyrrolidone, vinyl-N-methylpyridinium chloride, and the like. The presence of acid or basic groups in the monomer, or polymer resin is optional and such groups can be present in various amounts of from about 0.1 to about 10 percent by weight of the polymer resin. Chain transfer agents, such as dodecanethiol or carbon tetrabromide, can also be selected when preparing resin particles by emulsion polymerization. Other processes of obtaining resin particles of from about 0.01 micron to about 1 micron can be selected from polymer microsuspension process, such as illustrated in U.S. Pat No. 3,674,736, the disclosure of which is totally incorporated herein by reference, polymer solution microsuspension process, such as disclosed in U.S. Pat. No. 5,290,654, the disclosure of which is totally incorporated herein by reference, mechanical grinding process, or other known processes.

Examples of anionic surfactants include, for example, sodium dodecylsulfate (SDS), sodium dodecylbenzene sulfonate, sodium dodecylnaphthalene sulfate, dialkyl benzenealkyl, sulfates and sulfonates, abitic acid, available from Aldrich, NEOGEN RKT, NEOGEN SC™ from Kao and the like. An effective concentration of the anionic surfactant generally employed is, for example, from about 0.01 to about 10 percent by weight, and preferably from about 0.1 to about 5 percent by weight of monomers used to prepare the toner polymer resin.

Examples of nonionic surfactants include, for example, polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxypoly(ethyleneoxy) ethanol, available from Rhodia as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™. A suitable concentration of the nonionic surfactant is, for example, from about 0.01 to about 10 percent by weight, and preferably from about 0.1 to about 5 percent by weight of monomers used to prepare the toner polymer resin.

Examples of dispersants that are, for example, suitable for dispersing the magnetite particles can be functional copolymers, for example, methyl vinyl ether-maleic acid, methyl vinyl ethermaleic acid calcium sodium salt, hydrophobically modified polyethers, polyvinylpyrrolidone homopolymers, alkylated vinylpyrrolidone copolymers, vinyl acetate/vinylpyrrolidone copolymers, vinylpyrrolidone/styrene block, poly (methyl vinyl ether/maleic anhydride) (linear interpolymer with 1:1 molar ratio), dimethylaminoethyl methacrylate, ethylene-vinyl acetate copolymer of maleic anhydride and acrylic acid, polystyrene-maleic anhydride, styreneacrylic ester, ethyl acrylate/methyl methacrylate, carboxylated poly-n-butyl acrylates, ethylene vinyl alcohol, which allow the magnetite and/or carbon black to be readily dispersible into a submicron particle size of about 30 to about 400 nanometers in either an acid or a base resulting in a component that is stabilized by the resin particles. The solids content of the resin latex dispersion is not particularly limited, for example the solids content may be from, for example, about 10 to about 90 weight percent.

In some instances, pigments are available in the wet cake or concentrated form containing water, and can be easily dispersed utilizing a homogenizer or simply by stirring or ball milling or attrition, or media milling. In other instances, pigments are available only in a dry form, whereby dispersion in water is effected by microfluidizing using, for example, a M-110 microfluidizer or an ultimizer and passing the pigment dispersion from 1 to 10 times through the chamber, or by sonication, such as using a Branson 700 sonicator, or a homogenizer or ball milling or attrition, or media milling with the optional addition of dispersing agents such as the aforementioned ionic or nonionic surfactants. In the instance of preparing carbon black pigment or other pigment dispersion, the above techniques can also be applied in the presence of a surfactant.

Acicular magnetite selected which can, for example, be comprised of 21 percent FeO and 79 percent $Fe_2O_3$ possesses a coercivity of about 250 to about 700 Oe with a particle size in the range of about 0.6 micron in length×0.1 micron in diameter; B2510, B2540, B2550, HDM-S 7111 whose coercivity is from about 250 to about 500 Oe, the remanent magnetization (Br) is about 23 to 39 emu/g, and the saturation magnetization (Bm) is about 70 to about 90 emu/g, available from Magnox, Inc.; MR-BL whose coercivity is 340 Oe with a remanent magnetization (Br) of about 34 emu/g, and a saturation magnetization (Bm) of about 85 emu/g, available from Titan Kogyo and Columbia Chemicals; MTA-740 whose coercivity is 370 Oe with a remanent magnetization (Br) of about 30 emu/g, and a saturation magnetization (Bm) of about 83 emu/g, available from Toda Kogyo; AC 5151M whose coercivity is 270 Oe and its remanent magnetization (Br) is about 20 emu/g with a saturation magnetization (Bm) of about 79 emu/g, available from Bayer Corporation; M08029, M04232, M04431 whose coercivity is from about 250 to about 400 Oe with a remanent magnetization (Br) of about 23 to about 60 emu/g, and a saturation magnetization (Bm) of about 70 to about 90 emu/g, available from Elementis, Inc. The acicular magnetite selected can be present in amounts of from about 10 to about 35 weight percent and preferably in amounts of about 22 to about 32 weight percent by weight of toner.

The processes of the present invention in embodiments involves the blending of latexes, magnetite dispersions, carbon black dispersion and other suitable components wherein the acidified magnetite dispersion functions as a coagulant, and wherein the carbon black dispersion, wax dispersion, and the acidic anionic latex emulsion are usually subjected to high shear, for example, with a rotor stator device by stirring with a blade at about 3,000 to 10,000 rpm, or about 5,000 rpm for about 1 to about 120 minutes. A high shearing device, for example an intense homogenization device, such as the in-line IKA SD-41, may be used to ensure that the blend is homogeneous and uniformly dispersed. Following homogenization, aggregation of the homogenized composition is effected by heating the composition to a temperature below the glass transition temperature (Tg) of the latex resin while agitating the composition with the temperature of the heating being, for example, about 5° C. to about 20° C. below the Tg of the resin, and wherein the agitating comprises continuously stirring the mixture using a mechanical stirrer at between, for example, about 200 to about 800 rpm. The aggregation is conducted for a suitable period of time until the aggregate particle size is stabilized, which may be for from, for example, about 10 minutes to about 2 hours. The addition of the delayed latex, which can be comprised of the same latex formulation that is used initially or the added latex, can be comprised of a different composition, including molecular properties, Tg, is allowed to further mix for a period of about 30 to about 60 maximum to permit the latex resin to be completely adhered to the aggregates. Following aggregation and the addition of the remaining delayed components, the particles are coalesced by first changing the pH to about 6 to about 8 to primarily prevent the aggregates from further growth, followed by heating at a temperature above the Tg of the resin. The heating for coalescing is conducted at a temperature of, for example, from about 10° C. to about 50° C., or from about 25° C. to about 40° C. above the Tg of the resin for about 30 minutes to about 14 hours. During the coalescence, the pH is increased, for example, from about 1.8 to about 2.2 to about 6.5 to about 7.5 by any suitable pH increasing agent, for example sodium hydroxide. The increase in pH can stabilize the aggregate particles and prevents or minimizes any further growth and loss of GSD during further heating. After about 30 to about 90 minutes at the coalescence temperature, the pH is then gradually decreased to about 5.5 to about 6.5, wherein the reduction with an acid in pH permits coalescence.

The toner particles can also include known charge additives in effective amounts of, for example, from about 0.1 to about 5 weight percent such as alkyl pyridinium halides, bisulfates, the charge control additives of U.S. Pat Nos. 3,944,493; 4,007,293; 4,079,014; 4,394,430 and 4,560,635, the disclosures of which are totally incorporated herein by reference, and the like. Surface additives that can be added to the toner compositions after washing or drying include, for example, metal salts, metal salts of fatty acids, colloidal silicas, metal oxides, mixtures thereof, and the like, which additives are usually present in an amount of from about 0.1 to about 2 weight percent, reference U.S. Pat Nos. 3,590,000; 3,720,617; 3,655,374 and 3,983,045, the disclosures of which are totally incorporated herein by reference. Preferred additives include zinc stearate and AEROSIL R9720 available from Degussa in amounts of from about 0.1 to about 2 percent which can be added during the aggregation process or blended into the formed toner product.

Developer compositions can be prepared by mixing the toners obtained with the process of the present invention with known carrier particles, including coated carriers, such as steel, ferrites, and the like, reference U.S. Pat Nos. 4,937,166 and 4,935,326, the disclosures of which are totally incorporated herein by reference, for example from about 2 percent toner concentration to about 8 percent toner concentration.

By the process of the invention, toner particles of acceptable size and narrow dispersity are rapidly obtained. The toner particles preferably have an average volume diameter of from about 0.5 to about 25, and preferably from about 1 to about 10 microns, and a narrow GSD characteristic of from about 1.05 to about 1.25, and preferably of from about 1.15 to about 1.25 as measured by a Coulter Counter. The toner particles may also possess an excellent shape factor, for example, of 120 or less wherein the shape factor is a measure of smoothness and roundness, where a shape factor of 100 is considered substantially perfectly spherical and smooth, while a shape factor greater than about 150 is considered to be rough in surface morphology and the shape is like a potato.

The following Examples illustrate embodiments and some advantages of the present invention. Parts and percentages are by weight unless otherwise indicated.

EXAMPLES

Latex Formation Procedure:

A latex emulsion (i) comprised of polymer particles generated from the emulsion polymerization of styrene, butyl acrylate and beta carboxy ethyl acrylate (beta CEA) was prepared as follows. A surfactant solution of 434 grams of DOWFAX 2A1™ (anionic emulsifier) and 387 kilograms of deionized water was prepared by mixing these components for 10 minutes in a stainless steel holding tank. The holding tank was then purged with nitrogen for 5 minutes before transferring the mixture into a reactor. The reactor was then continuously purged with nitrogen while being stirred at 100 RPM. The reactor was then heated to 80° C.

Separately, 6.11 kilograms of ammonium persulfate initiator were dissolved in 30.2 kilograms of deionized water. Also, separately a monomer emulsion A was prepared in the following manner. 315.7 Kilograms of styrene, 91.66 kilograms of butyl acrylate, 12.21 kilograms of beta CEA, 7.13 kilograms of 1-dodecanethiol, 1.42 kilograms of decanediol diacrylate (ADOD), 8.24 kilograms of DOWVFAX™ (anionic surfactant), and 193 kilograms of deionized water were mixed to form an emulsion (A). Five percent of the above emulsion (A) was then slowly fed into the reactor at 80° C. (degrees Centigrade) to form the seeds wherein "seeds" refers, for example, to the initial emulsion latex added to the reactor, prior to the addition of the initiator solution, while being purged with nitrogen. The above initiator solution was then slowly charged into the reactor, forming about 5 to about 12 nanometers of latex "seed" particles. After 10 minutes, the remainder (95 percent) of the emulsion was continuously fed in to the reactor using metering pumps.

After all of the above was charged into the main reactor, the temperature was maintained at 80° C. for an additional 2 hours to complete the reaction. The reactor contents were then cooled down to about 25° C. The resulting isolated product was comprised of 40 weight percent of submicron, 0.5 micron volume average diameter, resin particles of styrene/butylacrylate/beta CEA 73.5:26.5:3 pph, respectively, suspended in an aqueous phase containing the above surfactant. The molecular properties resulting for the resin latex were $M_w$ of 39,000, $M_n$ of 10,800, each as measured by a Gel Permeation Chromatograph, and a midpoint Tg of 55.8° C., as measured by a Differential Scanning Calorimeter, where the midpoint Tg is the halfway point between the onset and the offset Tg of the polymer.

Wax and Pigment Dispersions:

The aqueous wax dispersion utilized in these Examples was generated with P725 ($M_w$ 725) polyethylene wax of a weight average molecular weight of 725 and a melting point of 104° C. or a P850 wax with molecular weight is 850 and a melting point of 107° C. and NEOGEN RK™ as an anionic surfactant/dispersant. The waxes are available from Baker-Petrolite. The particle size wax diameter was determined to be approximately 200 nanometers and the wax slurry was supplied with a solid loading of about 28 to about 30 percent.

The pigment dispersion utilized was an aqueous dispersion of carbon black (REGAL 330®) pigment supplied from Sun Chemicals. This pigment dispersion contained an anionic surfactant (NEOGEN RK™) and the pigment content of the dispersion as supplied was 18 percent, 2 percent anionic surfactant, and 80 percent water.

EXAMPLE I 30 Percent Acicular Magnetite With P725 Wax:

95 Grams of acicular black magnetite (B2550) composed of 21 percent FeO and 79 percent $Fe_2O_3$ having a particle size of 0.6 micron x 0.1 micron were dispersed in 600 grams of water containing 1.2 grams of 20 percent of an aqueous anionic surfactant (NEOGEN RK™) by ball milling for a period of 1 hour. The pH of the dispersion was found to be 6.7. A 4 percent nitric acid solution was then added to the magnetite dispersion to acidify the dispersion to a value of 2. The magnetite dispersion was transferred into a reaction kettle to which 83 grams of a carbon black (18 percent solids, 2 percent anionic surfactant, and 80 percent water) anionic dispersion was added, followed by the addition of 90 grams of 200 nanometer polyethylene P725 wax particles (30 percent solids, 2 percent anionic surfactant, 68 percent water), while homogenizing at speeds of 4,000 rpm. The resulting pigment wax mixture having a pH of 2.2 was then aggregated with 330 grams of an acidic anionic latex, which latex possessed a pH of 1.8, and comprised 250 nanometers submicron latex particles (40 percent solids) of styrene/butylacrylate/beta CEA. The resulting blend having a pH of 2 was then heated to a temperature of 50° C. for a period of 120 minutes to obtain toner size aggregates of 6.1 microns (volume average diameter throughout) with a GSD of 1.21 as measured on a Coulter Counter. 130 Grams of the above latex were then added to the aggregate mixture and left stirring for 45 minutes at a temperature of 48° C. resulting in a particle size of 6.5 microns with a GSD of 1.20. The resulting aggregate mixture was changed to a pH of 7.2 by the addition of an aqueous solution of 4 percent sodium hydroxide. The mixture was then heated to 93° C. during which the pH was maintained between about 7 to about 7.3 with the addition of aqueous 4 percent sodium hydroxide solution. After 30 minutes at 93° C. the pH was reduced in stages (e.g. 7.32 to 6.5 to 5.5) with an aqueous 2.5 percent nitric acid solution over a period of 1 hour. After a period of 10 hours at 93° C., the particle size measured was 6.8 microns with a GSD of 1.23. The resultant mixture was cooled and the toner obtained was washed 4 times with water and dried on the freeze dryer. The resulting toner was comprised of 30 percent magnetite, 57.1 percent styrene-butyl acrylate beta CEA resin, 4.4 percent carbon black, and 8.5 percent wax, and which toner possessed a magnetite signal of 120 percent of nominal where nominal was 100 percent and a remanence of 25.5 emu/g.

EXAMPLE II

P850 Wax:

95 Grams of acicular black magnetite (B2550) composed of 21 percent FeO and 79 percent $Fe_2O_3$ having a particle size of 0.6 micron×0.1 micron were dispersed in 600 grams of water containing 1.2 grams of a 20 percent aqueous anionic surfactant (NEOGEN RK™) by ball milling for a period of 1 hour. The pH of the dispersion as measured by a pH meter was found to be 6.6. A 4 percent nitric acid solution was then added to the magnetite dispersion to acidify the dispersion to a pH value of 2. The magnetite dispersion was transferred into a reaction kettle to which 90 grams of a dispersion of submicron polyethylene P850 wax particles (30 percent solids) were added, followed by the addition of 83 grams of a carbon black (18 percent solids) anionic dispersion, while homogenizing at speeds of 4,000 rpm. The resulting mixture having a pH of 2.25 was then aggregated with 330 grams of an acidic anionic latex having a pH of 1.8, and comprising submicron latex particles (40 percent solids) of styrene/butylacrylate/beta CEA. The resulting blend having a pH of 2.05 was then heated to a temperature of 50° C. for a period of 150 minutes to obtain toner size aggregates of 6.2 microns with a GSD of 1.20. 130 Grams of the above acidic anionic latex was then added to the aggregate mixture and left stirring for 60 minutes at a temperature of 48° C., resulting in a particle size of 6.6 microns with a GSD of 1.20. The aggregate mixture pH was changed to 7.2 with an aqueous solution of 4 percent sodium hydroxide. The mixture was then heated to 93° C. during which the pH is maintained between about 7 to about 7.3 with the addition of aqueous 4 percent sodium hydroxide solution. After 30 minutes at 93° C., the pH was reduced in stages (e.g. 7.32 to 6.5 to 5.5) with an aqueous 2.5 percent of nitric acid solution over a period of 1 hour. After a period of 3 hours, the particle size measured was 6.8 microns with a GSD of 1.23. Subsequent to a period of 10 hours at 93° C., the particle size measured was 6.9 microns with a GSD of 1.23. The resultant mixture was cooled, and the toner obtained was washed 4 times with water and dried. The resulting toner was comprised of 30 percent magnetite, 57.1 percent resin, 4.4 percent carbon black, and 8.5 percent wax, and provided a magnetite signal of 120 percent of nominal and a remanence of 26 emu/g.

EXAMPLE III

95 Grams of an acicular black magnetite (B2550) composed of 21 percent FeO and 79 percent $Fe_2O_3$ having a particle size of 0.6 micron×0.1 micron were dispersed in 600 grams of water containing 1 gram of a nonionic surfactant (ANTAROX CA 897™) by ball milling for a period of 1 hour. The pH of the dispersion was found to be 6.6. A 4 percent nitric acid solution was then added to the magnetite dispersion to acidify the dispersion to a pH of 2. The magnetite dispersion was transferred into a reaction kettle to which were added 330 grams of an acidic anionic latex having a pH of 1.8 comprising submicron latex particles (40 percent solids) of styrene/butylacrylate/beta CEA. The resulting magnetite pigment latex mixture having a pH of 2 was then added to the mixture 90 grams dispersion of submicron polyethylene P725 wax particles (30 percent solids), followed by the addition of 83 grams of a carbon black (18 percent solids) anionic dispersion, while homogenizing at a speed of 4,000 rpm. The resulting blend having a pH of 2 was then heated to a temperature of 50° C. for a period of 130 minutes to obtain toner size aggregates of 6.3 microns with a GSD of 1.21. 130 Grams of the above acidic anionic latex was then added to the aggregate mixture and left stirring for 50 minutes at a temperature of 48° C., resulting in a particle size of 6.7 microns with a GSD of 1.20. The pH of the aggregate mixture was changed to 7.2 by the addition of an aqueous solution of 4 percent sodium hydroxide. The mixture resulting was then heated to 93° C. during which the pH was maintained at about 7 to about 7.3 with the addition of an aqueous 4 percent sodium hydroxide solution. After 30 minutes at 93° C., the pH was reduced in stages (e.g. 7.2 to 6.5 to 5.5 with an aqueous 2.5 percent nitric acid solution over a period of 1 hour. After a period of 3 hours, the particle size measured was 6.9 microns with a GSD of 1.22; after 10 hours at 93° C., the particle size measured was 6.9 microns with a GSD of 1.23. The resultant mixture was cooled and the toner obtained was washed 4 times with water and dried on the freeze dryer. The resulting toner, which was comprised of 30 percent magnetite, 57.1 percent resin, 4.4 percent carbon black, and 8.5 percent wax, provided a magnetite signal of 120 percent of nominal and a remanence of 26 emu/g.

EXAMPLE IV

P850 Wax:

95 Grams of the acicular black magnetite (B2550) composed of 21 percent FeO and 79 percent $Fe_2O_3$ having a particle size of 0.6 micron×0.1 micron were dispersed in 600 grams of water containing 1.2 grams of a 20 percent aqueous anionic surfactant (NEOGEN RK™) by homogenizing or polytroning at a speed of 3,000 rpm for a period of 5 minutes. The pH of the dispersion was found to be 6.6. A 4 percent nitric acid solution was then added to the magnetite dispersion to acidify the dispersion to a pH of 2. The magnetite dispersion was transferred into a reaction kettle to which 90 grams of a dispersion of submicron polyethylene P850 wax particles (30 percent solids) were added, followed by the addition of 83 grams of a carbon black (18 percent solids) anionic dispersion, while homogenizing at a speed of 4,000 rpm. The resulting mixture with a pH of 2.25 was then aggregated with 330 grams of an acidic anionic latex having a pH of 1.8, and comprising submicron latex particles (40 percent solids) of styrene/butylacrylate/beta CEA. The resulting blend having a pH of 2 was then heated to a temperature of 50° C. for a period of 150 minutes to obtain toner size aggregates of 6.4 microns with a GSD of 1.20. 130 Grams of the above acidic anionic latex were then added to the aggregate mixture and left stirring for 40 minutes at a temperature of 49° C. resulting in a particle size of 6.7 microns with a GSD of 1.20. The pH of the aggregate mixture was changed to 7.2 by the addition of an aqueous solution of 4 percent sodium hydroxide. The mixture was then heated to 93° C. during which the pH was maintained at about 7 to about 7.3 with the addition of an aqueous 4 percent sodium hydroxide solution. After 30 minutes at 93° C., the pH was reduced in stages (e.g. 7.32 to 6.5 to 5.5) with an aqueous 2.5 percent nitric acid solution over a period of 1 hour; after 3 hours, the toner particle size measured was 6.8 microns with a GSD of 1.22. After a period of 10 hours at 93° C., the particle size measured was 6.9 microns with a GSD of 1.22. The resultant mixture was cooled and the toner obtained was washed 4 times with water and dried on the freeze dryer. The resulting toner, which was comprised of 30 percent magnetite, 57.1 percent resin, 4.4 percent carbon black, and 8.5 percent wax, provided a magnetite signal of 124 percent of nominal and a remanence of 26 emu/g.

EXAMPLE V

62 Grams of acicular or needle shape black magnetite (B2550) composed of 21 percent Fe and 79 percent $Fe_2O_3$ having a particle size of 0.6 micron in length×0.1 micron in diameter were dispersed in 500 grams of water to which were added 1.2 grams of a 20 percent aqueous anionic surfactant (NEOGEN RK™) and homogenized at 3,000 rpms for a period of 5 minutes. The pH of the dispersion was found to be 6.7. A 4 percent nitric acid solution was then added to the magnetite dispersion to acidify the dispersion to a pH of 2. The magnetite dispersion was transferred into a reaction kettle to which 83 grams of a carbon black (18 percent solids) anionic dispersion were added, followed by the addition of 90 grams of a dispersion of submicron polyethylene P725 wax particles (30 percent solids), while homogenizing at speeds of 4,000 rpm. The resulting pigment wax mixture having a pH of 2.2 was then aggregated with 360 grams of an acidic anionic latex having a pH of 1.8, and comprising submicron latex particles (40 percent solids) of styrene/butylacrylate/beta CEA. The resulting blend having a pH of 2 was then heated to a temperature of 50° C. for a period of 120 minutes to obtain toner size aggregates of 6.3 microns with a GSD of 1.21. 140 Grams of the above latex was then added to the aggregate mixture and left stirring for 45 minutes at a temperature of 49° C. resulting in a particle size of 6.4 microns with a GSD of 1.27. The mixture was allowed to further aggregate for an additional 2 hours resulting in a particle size of 6.5 microns with a GSD of 1.26. The pH of the aggregate mixture was changed to 7.2 by the addition of an aqueous solution of 4 percent sodium hydroxide. The mixture resulting was then heated to 93° C. during which the pH was maintained at about 7 to about 7.3 by the addition of an aqueous 4 percent sodium hydroxide solution. The particle size during the heat up to 93° C. was 6.5 microns with a GSD of 1.26. A toner sample when placed under a magnet indicated possible latex rejection, indicating that the charge was not sufficient enough to incorporate all of the delayed latex. After 30 minutes at 93° C., the pH was reduced in stages (e,g. 7.32 to 6.5 to 5.5) with an aqueous 2.5 percent nitric acid solution over a period of 1 hour. After a period of 10 hours at 93° C., the particle size measured was 6.4 microns with a GSD of 1.26. The resultant mixture was cooled and the toner obtained was washed 4 times with water and dried on a freeze dryer. The resulting toner comprised of 20 percent magnetite, 66.3 percent resin, 4.9 percent carbon black, and 8.8 percent wax provided a magnetite signal of 78 percent of nominal and remanence of 17 emu/g.

The magnetic signal is the measure of the standard calibration document as defined by the Banker's Association Standard and Specifications for MICR Encoded Document. Generally, each country sets a minimum percent signal level, for example the minimum signal level in the USA is 50 percent of the nominal, while in Canada it is 80 percent of the nominal. To ensure latitude in the printing process, it is generally desirable to exceed the nominal specification of 100 percent to minimize document rejection rates.

Other embodiments and modifications of the present invention may occur to those skilled in the art subsequent to a review of the information presented herein; these embodiments and modifications, equivalents thereof, substantial equivalents thereof, or similar equivalents thereof are also included within the scope of this invention.

What is claimed is:

1. A toner process comprising heating a mixture of an acidified dispersion of an acicular magnetite with a colorant dispersion of carbon black, a wax dispersion, and an acidic latex emulsion, and wherein said heating comprises a first heating and a second heating, and wherein the second heating is at a higher temperature than the first temperature; and wherein said second heating is equal to about or above about the glass transition temperature of a polymer contained in said acidic latex.

2. A process in accordance with claim 1 wherein said acidified dispersion of said acicular magnetite particles contains water, and an anionic surfactant wherein said acidified dispersion is at a pH of about 1.8 to about 2.2, and which pH is achieved by the addition of an acid, resulting in inducing a positive charge on the surface of the magnetite particles and subsequently adding said dispersion of carbon black containing water, carbon black and an anionic surfactant, and thereafter adding said wax dispersion comprised of submicron wax particles of from about 0.1 to about 0.5 micron in diameter by volume, and which wax is dispersed in an anionic surfactant;

(ii) mixing said magnetite, carbon black, and wax dispersions with said latex emulsion comprised of an anionic surfactant, water and resin, and which emulsion is at a pH of about 1.5 to about 2.3;

(iii) wherein the resulting blend possesses a pH of about 2 to about 2.2 thereby retaining sufficient positive charge on the magnetite particles to initiate flocculation or aggregation of said magnetite, carbon black, wax and resin latex;

(iv) heating the resulting mixture below about the glass transition temperature (Tg) of the latex resin to form toner sized aggregates;

(v) optionally adding to the formed toner aggregates a second latex comprised of resin suspended in an aqueous phase containing an anionic surfactant and water, which second latex possesses a pH of about 1.5 to about 2.2 and stirring to enable the incorporation of the second latex on the aggregate surface thereby providing a shell;

(vi) adding to the resulting mixture a base to thereby change the pH which is initially from about 1.8 to about 2.2 to a pH of from about 6.9 to about 7.3 for the resulting toner aggregate mixture;

(vii) heating the resulting aggregate suspension of (vi) above about the Tg of the latex resin of (i), while maintaining the pH at a value of about 6.9 to about 7.3;

(viii) optionally retaining the mixture temperature at from about 85° C. to about 95° C., followed by a pH reduction with an acid to arrive at a pH of about 5.3 to about 5.8;

(ix) optionally retaining the mixture temperature at from about 85° C. to about 95° C. to obtain smooth toner particles; and (x) isolating the toner.

3. A process in accordance with claim 1 wherein said magnetite dispersion comprises acicular magnetite particles dispersed in water, an anionic surfactant, and optionally a nonionic surfactant wherever said dispersion possesses an initial pH of from about 6.5 to about 6.8, which magnetite dispersion is then acidified to a pH of about 1.8 to about 2.2 resulting in an induction of a positive charge of about +35 to about +45 coulombs/cm$^2$ on the magnetite particles.

4. A process in accordance with claim 1 wherein said carbon black dispersion comprises carbon black particles dispersed in water and an anionic surfactant, and which dispersion possesses a pH of about 6.3 to about 6.8.

5. A process in accordance with claim 1 wherein said acidified dispersion contains acicular magnetite in an amount of from about 22 to about 35 percent by weight of toner, and wherein in the presence of an acidic anionic latex said magnetite is positively charged.

6. A process in accordance with claim 1 wherein said acicular magnetite is present in an amount of from about 23 to about 32 percent by weight of toner, and wherein in the presence of an acidic environment at a pH of about 1.8 to about 3.5, said magnetite possesses a positive charge, thereby also functioning as a coagulant.

7. A process in accordance with claim 1 wherein said acicular magnetite exhibits a coercivity of from about 250 to about 700 Oe.

8. A process in accordance with claim 1 wherein said acicular or needle shape magnetite particles has a particle size of about 0.6 micron in length by 0.1 micron in diameter.

9. A process in accordance with claim 1 wherein said toner exhibits a magnetic signal of from about 115 to about 150 percent of the nominal signal.

10. A process in accordance with claim 1 wherein the toner possesses a minimum fix temperature (MFT) of about 170° C. to about 195° C.

11. A process in accordance with claim 10 wherein the toner hot offset temperature (HOT) is about 210° C. to about 250° C.

12. A process in accordance with claim 1 wherein the magnetite dispersion is obtained by a ball milling, attrition, polytroning, homogenizing or media milling resulting in magnetite particles dispersed in water containing an anionic surfactant.

13. A process in accordance with claim 1 wherein the carbon black dispersion is present in an amount of about 4 to about 8 percent by weight of toner.

14. A process in accordance with claim 1 wherein the latex emulsion contains resin particles of from about 0.15 to about 0.3 micron in volume average diameter.

15. A process in accordance with claim 1 wherein magnetite is of a size of about 0.6 micron to about 0.1 micron, and said carbon black is of a size of about 0.01 to about 0.2 micron each in average volume diameter.

16. A process in accordance with claim 2 wherein said acid is selected from the group consisting of nitric, sulfuric, hydrochloric, citric and acetic acid.

17. A process in accordance with claim 2 wherein said base is selected from the group consisting of sodium hydroxide, potassium hydroxide, and ammonium hydroxide.

18. A process in accordance with claim 2 wherein there is added to the formed toner aggregates a second latex comprised of submicron resin particles suspended in an aqueous phase containing an anionic surfactant, and wherein said second latex is selected in an amount of from about 10 to about 40 percent by weight of the initial latex to form a shell thereover on said formed aggregates, and which shell is of a thickness of about 0.2 to about 0.8 micron.

19. A process in accordance with claim 18 wherein the added latex contains the same resin as the initial latex of (i), or wherein said added latex contains a dissimilar resin than that of the initial latex.

20. A process in accordance with claim 2 (v) wherein the pH of the mixture resulting in (vi) is increased from about 2 to about 2.6 to about 6.5 to about 7.2, and wherein said base functions primarily as a stabilizer for the aggregates during coalescence, and no or minimal toner particle size increase results.

21. A process in accordance with claim 2 wherein the temperature at which toner sized aggregates are formed controls the size of the aggregates, and wherein the final toner size is from about 5 to about 12 microns in volume average diameter.

22. A process in accordance with claim 2 wherein the aggregation (iv) temperature is from about 45° C. to about 60° C., and wherein the coalescence temperature of (vii) is from about 85° C. to about 95° C.

23. A process in accordance with claim 2 wherein the time of coalescence or fusion is from about 6 to about 15 hours, and wherein there are provided toner particles with a smooth morphology.

24. A process in accordance with claim 1 wherein the latex contains a resin or polymer selected from the group consisting of poly(styrene-alkyl acrylate), poly(styrene-1,3-diene), poly(styrene-alkyl methacrylate), poly(styrene-alkyl acrylate-acrylic acid), poly(styrene-1,3-diene-acrylic acid), poly(styrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly(styrene-alkyl acrylate-acrylonitrile-acrylic acid), poly(styrene-1,3-diene-acrylonitrile-acrylic acid), and poly(alkyl acrylate-acrylonitrile-acrylic acid).

25. A process in accordance with claim 2 wherein the latex contains a resin selected from the group consisting of poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly (propyl acrylate-isoprene), poly(butyl acrylate-isoprene); poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylonitrile), and poly(styrene-butyl acrylate-acrylononitrile-acrylic acid).

26. A process in accordance with claim 1 wherein the acidification of the magnetite dispersion comprised of acicular magnetite particles, water, and an anionic surfactant possesses a positive charge and functions as a colorant and as a coagulant, and wherein said acidic pH is from about 1 to about 6.

27. A process in accordance with claim 1 wherein the latex comprises about 40 percent solids, about 1.3 percent anionic surfactant, and water; the magnetite dispersion comprises about 30 percent magnetite, about 1.3 percent anionic surfactant, and water, and the wax is a polypropylene, a polyethylene, a carnuba wax, and mixtures thereof.

28. A toner process comprising heating an acidified dispersion of an acicular magnetite, a carbon black colorant dispersion, an optional wax dispersion, and a latex, and which heating comprises a first heating and a second heating, and wherein the first heating is accomplished below the glass transition temperature (Tg) of a resin contained in said latex, and wherein the second heating is above the glass transition temperature of a resin contained in said latex.

29. A process in accordance with claim 28 wherein said acidified dispersion is at a pH of about 1 to about 5.

30. A process in accordance with claim 28 wherein acidified is at a pH of about 2 to about 4.

31. A process in accordance with claim 1 wherein there is further included in said mixture a coagulant.

32. A toner process consisting essentially of heating a mixture of an acidified dispersion of an acicular magnetite with a colorant dispersion of carbon black, a wax dispersion, and an acidic latex emulsion, and wherein said heating comprises a first heating and a second heating, and wherein the second heating is at a higher temperature than the first heating; and wherein said first heating is equal to about or above about the glass transition temperature of a polymer contained in said latex.

* * * * *